United States Patent
Nishiura et al.

(10) Patent No.: US 7,931,110 B2
(45) Date of Patent: Apr. 26, 2011

(54) ELECTRIC MOTORCYCLE

(75) Inventors: Hisao Nishiura, Saitama (JP); Yoshihisa Kanno, Saitama (JP); Toshiaki Takamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 12/569,388

(22) Filed: Sep. 29, 2009

(65) Prior Publication Data
US 2010/0078251 A1    Apr. 1, 2010

(30) Foreign Application Priority Data
Sep. 30, 2008 (JP) ................. 2008-255461

(51) Int. Cl.
*B62M 7/12* (2006.01)
*B60K 11/06* (2006.01)

(52) U.S. Cl. ...... 180/220; 180/218; 180/65.1; 180/68.1; 180/68.2; 180/68.5

(58) Field of Classification Search .............. 180/220, 180/218, 65.1, 68.1, 68.2, 68.5
See application file for complete search history.

(56) References Cited

U.S. PATENT DOCUMENTS

| | | | | |
|---|---|---|---|---|
| 5,421,427 A | * | 6/1995 | Ogawa et al. ............... 180/220 |
| 5,577,747 A | * | 11/1996 | Ogawa et al. ............... 180/220 |
| 5,613,569 A | * | 3/1997 | Sugioka et al. ............. 180/68.5 |
| 5,828,192 A | * | 10/1998 | Kawaguchi et al. ........ 318/139 |
| 7,210,550 B2 | * | 5/2007 | Yonehana et al. ........... 180/220 |
| 2004/0069549 A1 | * | 4/2004 | Ono et al. ................... 180/65.8 |
| 2004/0238242 A1 | | 12/2004 | Honda et al. |
| 2005/0177285 A1 | * | 8/2005 | Honda ............................ 701/22 |
| 2005/0217910 A1 | * | 10/2005 | Yonehana et al. ........... 180/68.5 |
| 2010/0078248 A1 | * | 4/2010 | Kanno et al. ................ 180/220 |

FOREIGN PATENT DOCUMENTS
JP          3317560 B2        8/2002

* cited by examiner

*Primary Examiner* — Joanne Silbermann
*Assistant Examiner* — Marlon A Arce
(74) *Attorney, Agent, or Firm* — Birch, Stewart, Kolasch & Birch, LLP

(57) ABSTRACT

An electric motorcycle is provided that can air-cool a power drive unit without the provision of a plurality of cooling fans. In an electric vehicle in which a battery box housing batteries is disposed below a foot rest space and electricity supplied from the batteries is supplied to a running-purpose power-generating motor via a power drive unit, the power drive unit is attached to a swing arm turning around a pivot shaft and the battery box is formed with an air introduction port and an air discharge port used to cool the batteries. A cooling fan is provided which sucks air in the battery box from the air discharge port and sends the air toward the power drive unit. The cooling fan is disposed rearward of the air discharge port of the battery box and close to the pivot shaft.

18 Claims, 12 Drawing Sheets

ELECTRIC MOTORCYCLE

CROSS-REFERENCE TO RELATED APPLICATIONS

This application claims priority under 35 U.S.C. §119(a) to Application No. 2008-255461, filed in Japan on Sep. 30, 2008, the entirety of which is expressly incorporated herein by reference.

BACKGROUND OF THE INVENTION

1. Field of the Invention

The present invention relates to an electric motorcycle capable of cooling high-temperature devices such as a battery, etc. mounted on a vehicle body.

2. Description of Background Art

There is known an electric motorcycle in which a battery is mounted to supply electricity to a running-purpose power-generating motor for driving. In such an electric motor, to cool a heat-producing battery, air in a battery box that houses the battery is sucked by a cooling fan to cool the inside thereof (see, e.g. Japanese Patent No. 3317560).

In such an electric motorcycle, it is preferable to cool not only the battery but also, e.g. a power drive unit incorporating a drive circuit, etc., and the coil of a power-generating motor because they produce heat. However, to mount cooling fans to such devices for cooling, arrangement spaces for the cooling fans are needed. In addition, the number of component parts is increased to increase assembly man-hours and costs.

SUMMARY OF THE INVENTION

The present invention has been made in view of the above-mentioned situations and aims to provide an electric motorcycle that can air-cool a power drive unit without the provision of a plurality of cooling fans.

To solve the above problem, in the present invention, an electric motorcycle includes a battery box that houses a battery. The battery box is disposed below a foot rest space. Electricity supplied from the battery is supplied to a running-purpose power-generating motor via a power drive unit. The power drive unit is attached to a swing arm turning around a pivot shaft. The battery box is formed with an air introduction port and an air discharge port used to cool the battery. A cooling fan is provided which sucks air in the battery box from the air discharge port and sends the air toward the power drive unit. The cooling fan is disposed rearward of the air discharge port of the battery box and close to the pivot shaft.

According to this configuration, the cooling fan can be disposed between the air discharge port of the battery box and the power drive unit.

Additionally, the swing arm may be formed with an air introduction space where the power drive unit can be air-cooled and air sent from the cooling fan may be sent toward the air introduction space.

According to this configuration, the power drive unit can be air-cooled more efficiently by air sent by the cooling fan to the air introduction space.

Further, an opening portion of the air introduction space may be disposed close to the pivot shaft and the cooling fan may be attached to the opening portion.

According to this configuration, it is not necessary to provide an attachment space for the cooling fan on the vehicle body side. In addition, all the air sent by the cooling fan can be sent to the air introduction space.

An air guide duct adapted to lead air discharged from the air discharge port may be attached to the opening portion of the air introduction space.

According to the configuration, air sucked from the air discharge port can be sent to the air introduction space via the air guide duct.

In the present invention, the electric motorcycle includes the battery box that houses a battery and is disposed below the foot rest space. Electricity supplied from the battery is supplied to a running-purpose power-generating motor via a power drive unit configured as below. The power drive unit is attached to the swing arm turning around the pivot shaft and the battery box is formed with the air introduction port and the air discharge port used to cool the battery. The cooling fan is provided which sucks air in the battery box from the air discharge port and sends the air toward the power drive unit. The cooling fan is disposed rearward of the air discharge port of the battery box and close to the pivot shaft. Therefore, the cooling fan is disposed between the air discharge port of the battery box and the power drive unit. Thus, the battery and the power drive unit can jointly be air-cooled by the single cooling fan.

The swing arm is formed with the air introduction space where the power drive unit can be air-cooled and air sent from the cooling fan is sent toward the air introduction space. Thus, the power drive unit can be air-cooled more efficiently by the cooling fan sending air to the air introduction space.

The opening portion of the air introduction space is disposed close to the pivot shaft and the cooling fan is attached to the opening portion. Thus, it is not necessary to provide an attachment space for the cooling fan on the vehicle body side, which can enhance design freedom. Cooling efficiency can be more increased by sending all the air sent by the cooling fan to the air introduction space.

The air guide duct adapted to lead air discharged from the air discharge port is attached to the opening portion of the air introduction space. Thus, air sucked from the air discharge port can be sent to the air introduction space via the air guide duct, which can more increase cooling efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
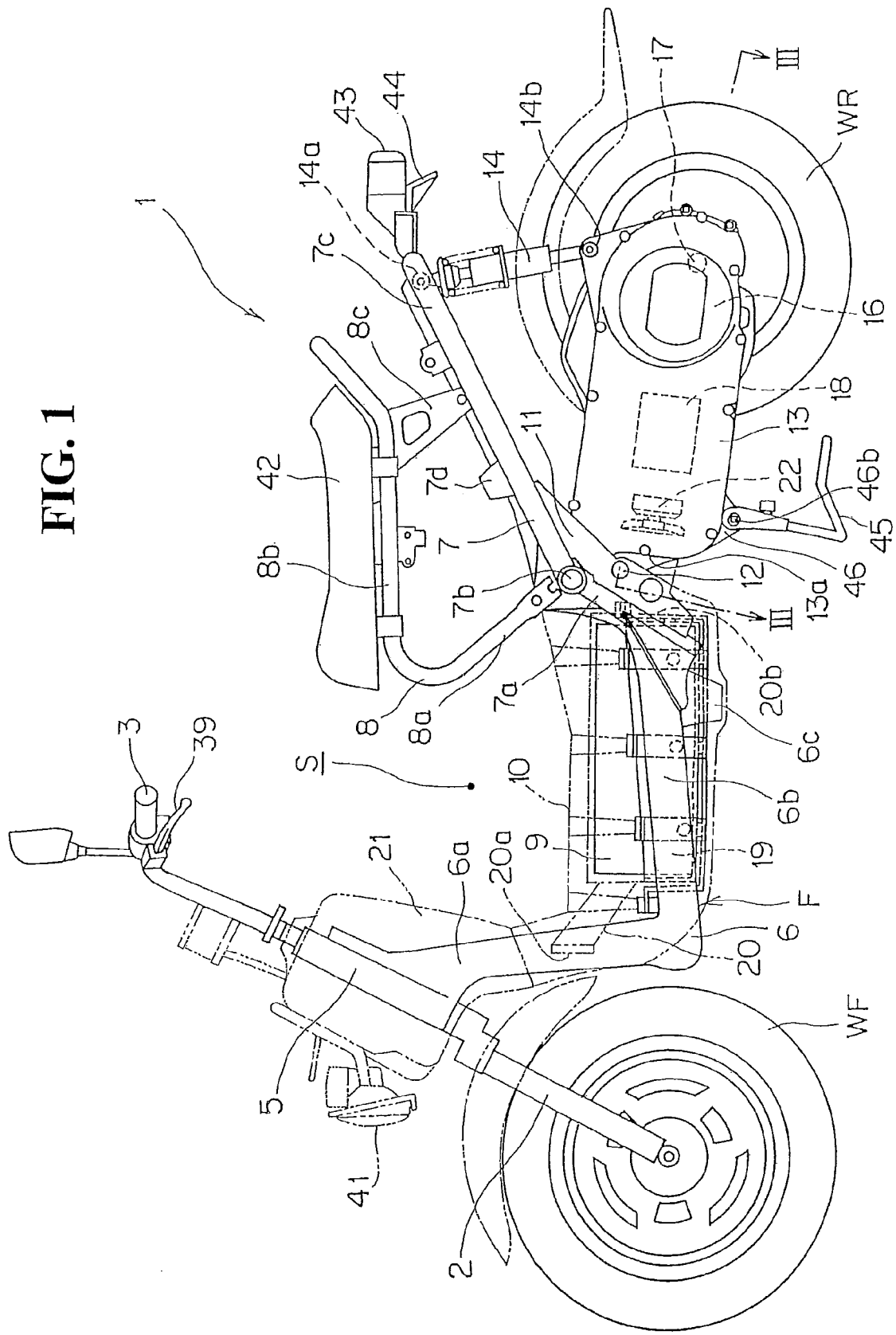
FIG. 1 is a lateral view of an electric motorcycle according to an embodiment of the present invention.

The present invention will now be described with reference to the accompanying drawings, wherein the same reference numerals have been used to identify the same or similar elements throughout the several views. It is to be noted that in the following description directions such as upside and downside, back and forth, and right and left are based on the perspective of a rider.

Figure 2:
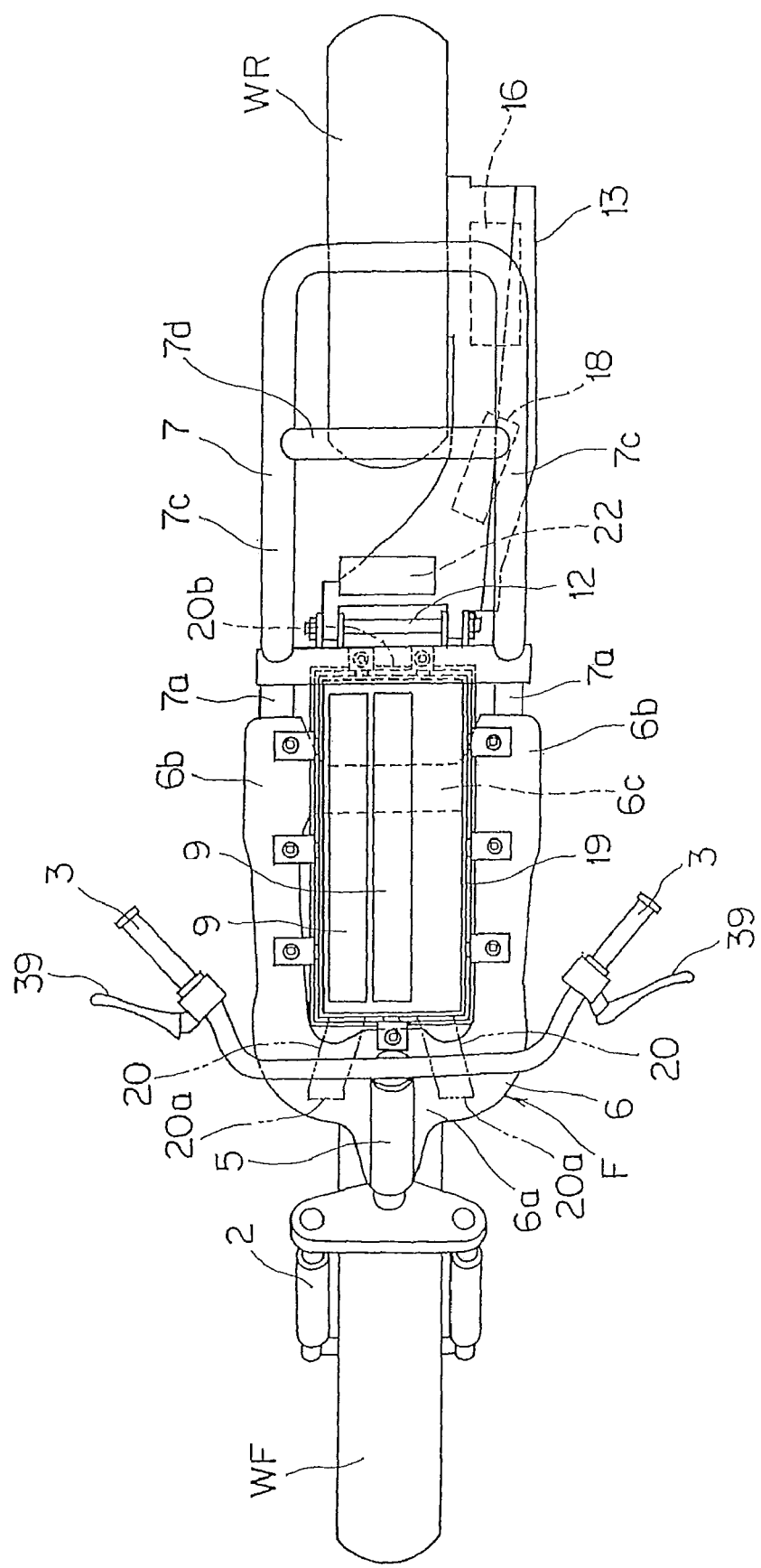
FIG. 2 is a plan view of FIG. 1.

FIG. 1 is a lateral view of a battery-powered electric vehicle according to an embodiment of the present invention. FIG. 2 is a plan view of FIG. 1. Incidentally, for easy explanation, FIG. 2 omits seat rails 8, a fender cover 21 and a step floor 10 described in FIG. 1.

Referring to FIG. 1, a body frame F of the electric motorcycle 1 includes at a front end a front fork 2 rotatably supporting a front wheel WF and a head pipe 5 steerably supporting a steering handlebar 3 connected to the front fork 2. In addition, the body frame F includes a center frame 6, a rear frame 7 and a seat rail 8. Incidentally, the frames 6, 7, 8 are each formed as a pair symmetrical with each other in a vehicle body-width direction as illustrated in FIG. 2.

The center frame 6 is composed of an inclined portion 6a provided continuously with the above-mentioned head pipe 5 so as to extend rearward and obliquely downwardly in the vehicle body and a horizontal portion 6b bending at a lower end of the inclined portion 6a and generally horizontally extending toward the rearward of the vehicle body. In addition, the center frame 6 is such that the right and left horizontal portions are connected by a cross member 6c in the vehicle-width direction.

The rear frame 7 is composed of a first inclined portion 7a and a second inclined portion 7c. The first inclined portion 7a extends from the rear end of the horizontal portion 6b of the center frame 6 toward the rearward and obliquely upside of the vehicle body. The second inclined portion 7c extends from a bent portion 7b bent at the rear end of the first inclined portion 7a toward the rearward and obliquely upside of the vehicle body at a more moderate slope than the first inclined portion 7a. The second inclined portion 7c is such that its right and left portions are connected by a cross frame 7d extending in the vehicle body-width direction as shown in FIG. 2.

The seat rail 8 is attached to the upside of the rear frame 7 so as to form a generally inverse-U shape. In addition, the seat rail 8 is composed of an inclined portion 8a, a horizontal portion 8b and a support portion 8c. The inclined portion 8a extends from the bent portion 7b of the rear frame 7 toward the front and oblique upside of the vehicle body. The horizontal portion 8b extends horizontally rearward from the upper end of the inclined portion 8a. The support portion 8c extends rearward and obliquely downwardly from the rear portion of the horizontal portion 8b toward the second inclined portion 7c of the rear frame 7.

As illustrated in FIGS. 1 and 2, batteries 9, detailed later, are housed in a battery box 19 on the horizontal portion 6b of the center frame 6. The battery box 19 is mounted in such a manner as to be clamped between the pair of right and left frames of the horizontal portion 6b. The bottom face of the battery box 19 is located below the horizontal portion 6b as viewed in side elevation in FIG. 1. The cross member 6c of the center frame 6 is formed such that its central portion in the vehicle body-width direction sags downward. The battery box 19 is fixedly mounted on the cross member 6c.

A portion in which the battery box 19 is disposed corresponds to a portion below the so-called foot rest space S. The battery box 19 is covered from above by a step floor 10 adapted to receive rider's feet thereon.

The battery box 19 is formed like a generally rectangular parallelepiped box housing the batteries 9 therein. The batteries 9 are arranged in a row inside the battery box 19. Air introduction ducts 20 are provided on either side of the front surface of the battery box 19 so as to take outside air into the inside of the box. On the other hand, a discharge port 20b is formed in the rear surface of the battery box 19 so as to discharge the air outside.

In this way, outside air taken into from introduction ports 20a (the air introduction ducts 20) can cool the batteries 9 and the outside air that has cooled the batteries 9 can be discharged from the discharge port 20b.

As illustrated in FIG. 1, pivot plates 11 projecting toward the rearward of the vehicle body are provided on the respective right and left portions of the rear frame 7 at a position close to a connecting portion to the center frame 6 and below the bent portion 7b. A pivot shaft 12 is provided to be spanned between and passed through the right and left pivot plates 11 in the vehicle-width direction. The swing arm 13 is connected at its front end to the pivot shaft 12 so as to swing up and down around the pivot shaft 12.

The swing arm 13 is connected to the second inclined portion 7c of the rear frame 7 by means of a rear suspension 14 located on the left side of the vehicle body-width direction. More specifically, an upper end 14a of the rear suspension 14 is attached to the second inclined portion 7c of the rear frame 7 and a lower end 14b of the rear suspension 14 is attached to the rear portion of the swing arm 13. In this way, the rear suspension 14 absorbs the vertical vibration of the rear wheel WR supported by the rear end portion of the swing arm 13.

A pair of swing support portions 13b are provided at the front leading end portion of the swing arm 13 so as to be swingably attached to the pivot shaft 12 in such a manner as to be spaced from each other in the right-left of the vehicle body-width direction. In the state of being attached to the pivot shaft 12, the swing arm 13 obliquely extends from the pivot shaft 12 (the swing support portions 13b) toward the rearward and obliquely left side of the vehicle body, avoiding the rear wheel WR, and terminates at the rear of the vehicle body along the left side of the rear wheel WR. The swing arm 13 is provided at its rear portion with a rear axle 17 extending in the vehicle-width direction. The rear wheel WR is rotatably cantilever supported by the rear axle 17.

Incidentally, in FIGS. 1 and 2, reference numeral 41 identifies a headlight for illuminating the front of the vehicle body, 42 identifies an occupant seat horizontally mounted to the horizontal portion 8b of the seat rail 8, 43 identifies a brake lamp attached to the rear end portion of the rear frame 7, and 44 identifies a reflector located below the brake lamp 43.

Figure 3:
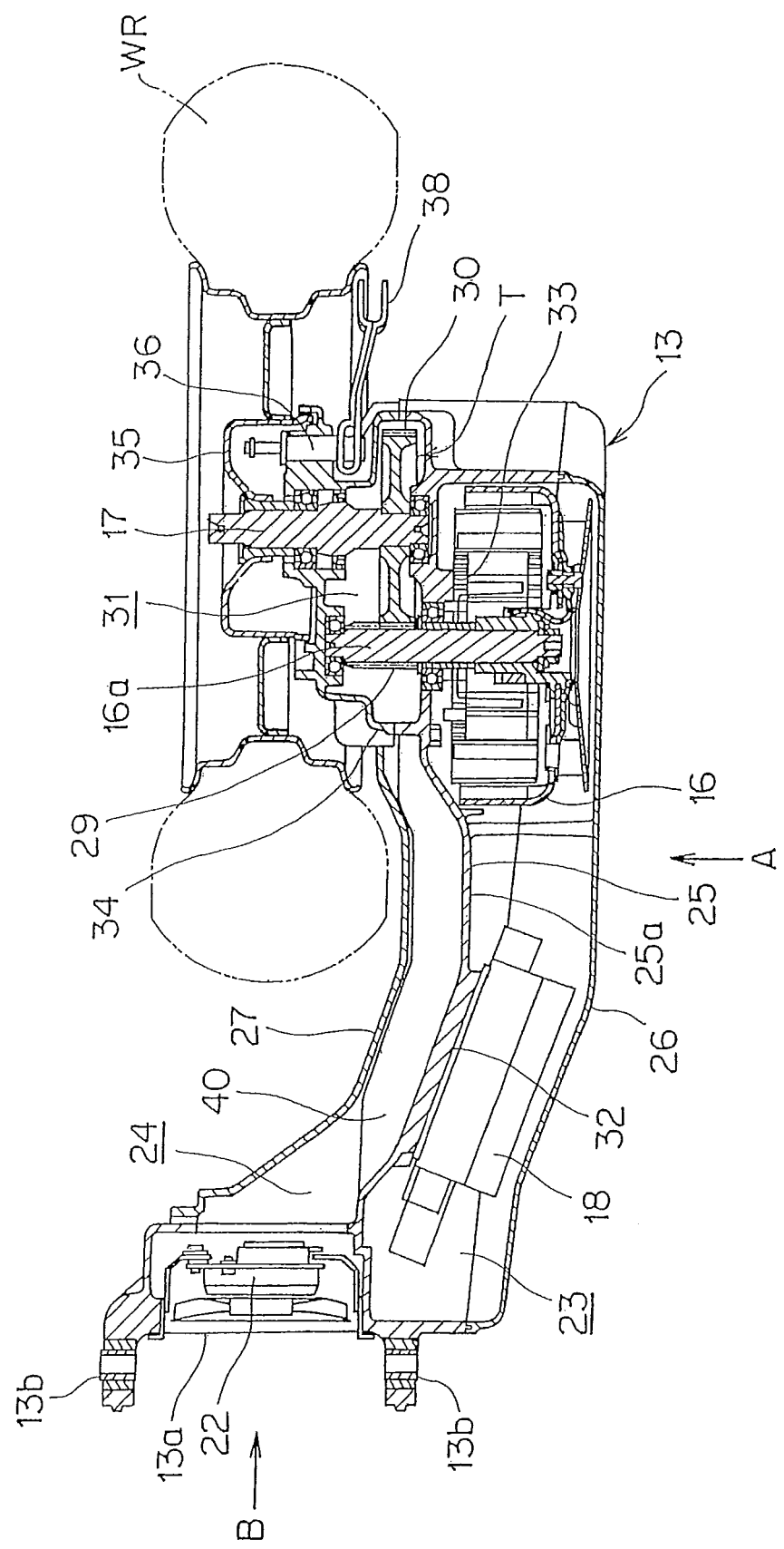
FIG. 3 is a cross-sectional view illustrating a swing arm alone, taken along line III-III of FIG. 1.
Figure 4:
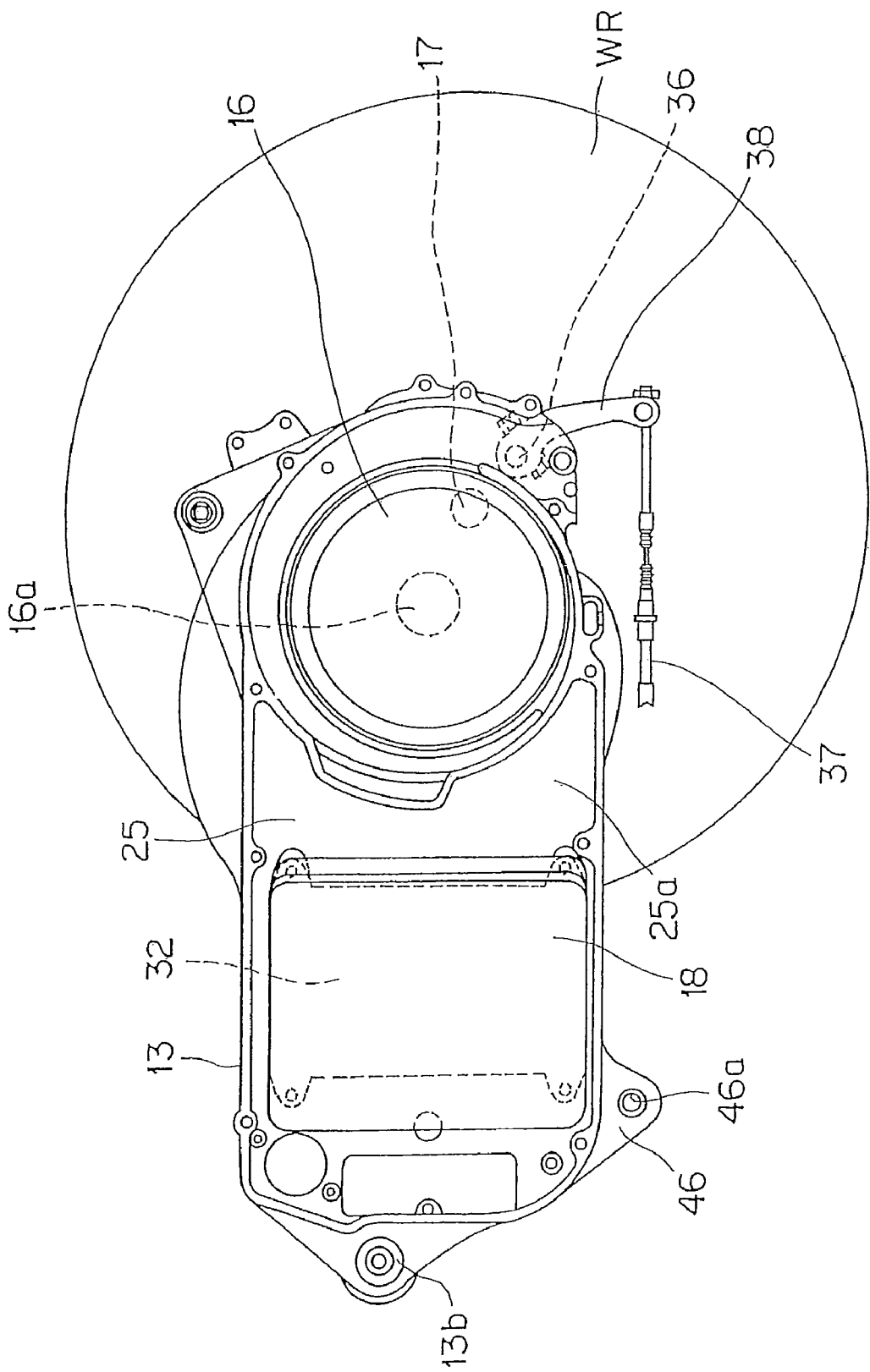
FIG. 4 is a left lateral view of FIG. 3.
Figure 5:
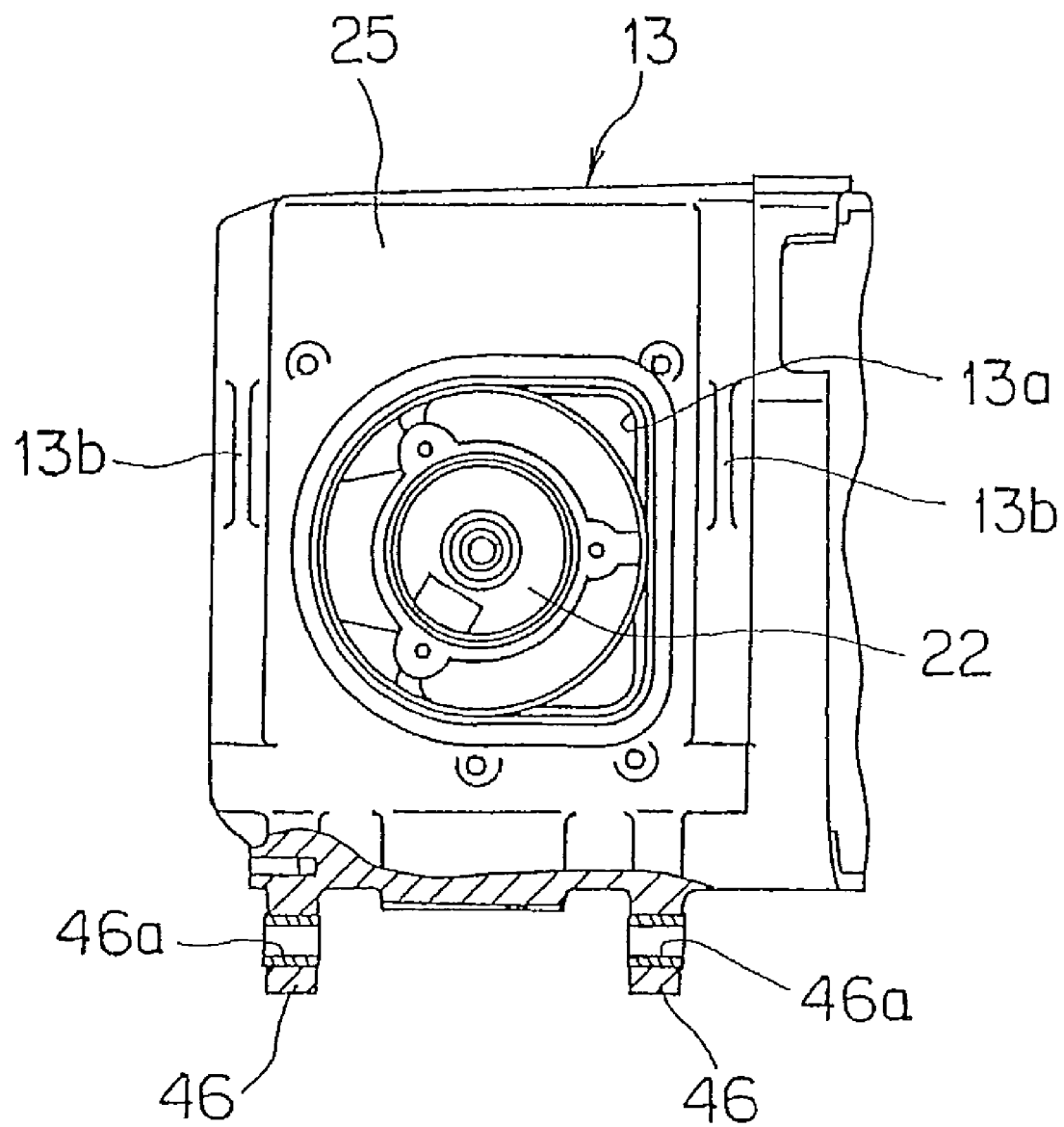
FIG. 5 is a view as viewed from the front side of a vehicle body in FIG. 3.

FIG. 3 is a sectional plan view illustrating the swing arm 13 alone, taken along line III-III of FIG. 1. FIG. 4 is a left lateral view of FIG. 3 (a view as viewed from an A-direction of FIG. 3), with a left cover (an outer cover) 26 depicted in FIG. 3 removed. FIG. 5 is a view as viewed from the front side of the vehicle body (B-direction in FIG. 3).

Referring to FIG. 3, the swing arm 13 is configured by assembling a main body portion 25 having a partition wall 25a extending in the back and forth direction of the vehicle body, a left cover 26 covering the left lateral surface of the main body portion 25, and a right cover 27 covering the right lateral surface of the main body portion 25.

The swing arm 13 is internally formed with two spaces: a device installation space 23 located on the left side of the vehicle body (on the outside of the vehicle body) and an air introduction space 24 located on the right side of the vehicle body (on the inside of the vehicle body). The spaces 23, 24 are defined on the right and left in the vehicle body-width direction by the above-mentioned partition wall 25a and extend in the back and forth direction of the vehicle body.

The left lateral surface of the device installation space 23 is closed by removably attaching the above-mentioned left cover 26 thereto with bolts or the like. The right lateral surface of the air introduction space 24 is closed by removably attaching the above-mentioned right cover 27 thereto, similarly, with bolts or the like.

A power-generating motor 16 for driving the rear wheel WR and a PDU 18 (Power drive unit) for controlling the power-generating motor 16 are housed in the device installation space 23. The power-generating motor 16 and the PDU 18 can be maintained by removing the left cover 26.

As illustrated in FIG. 3, the power-generating motor 16 is disposed at the rear portion of the swing arm 13 so as to be removably mounted to a power-generating motor-mounting portion 33 formed on the partition wall 25a. A drive shaft 16a of the power-generating motor 16 is disposed generally parallel to the rear axle 17 of the rear wheel WR. In addition, the drive shaft 16a passes through the partition wall 25a so as to project from the device installation space 23 to the air introduction space 24. A drive gear 29 is carried on the drive shaft 16a and meshes with a reduction gear 30 carried on the rear axle 17. The drive gear 29 has a diameter smaller than that of the reduction gear 30 and transmits the drive force of the power-generating motor 16 to the rear axle 17 in such a manner as to reduce a reduction ratio by one stage.

A gear cover 34 is attached to the main body portion 25 to cover a power transmission portion such as the drive gear 29, the reduction gear 30, etc. The gear cover 34 defines the air introduction space 24 and a drive force transmitting space 31 in which the above-mentioned power transmission portion is disposed. The drive force transmitting space 31 is internally sealed up to keep lubricating oil therein.

A pin member 36 is provided on the gear cover 34 so as to operate a drum brake unit 35. The drum brake unit 35 is operated by operating a brake handle 39 attached to a left steering handlebar 3. Specifically, the brake handle 39 is operated to turn a brake lever 38 via a brake wire 37 illustrated in FIG. 4 so that the pin member 36 attached to the brake lever 38 is operated to operate a brake for the rear wheel WR.

As illustrated in FIGS. 2 and 3, the PDU 18 is disposed forward of the power-generating motor 16 and removably attached, with bolts or the like, to a PDU attachment surface 32 formed on the partition wall 25a. The PDU 18 houses therein a drive circuit, a capacitor, a heat sink, etc., not illustrated.

The PDU 18 is connected to the battery 9 via not illustrated wiring so that electric power is supplied from the battery 9 to the PDU 18. In addition, the PDU 18 is connected via wiring to an ECU (Electric Control Unit), not illustrated, in which a control program and the like are stored so that a control signal is routed from the ECU to the PDU 18. Further, the PDU 18 is connected to the power-generating motor 16 via not illustrated wiring so that electric power and a control signal are routed to the power-generating motor 16 from the PDU 18. Incidentally, the above-described ECU is attached to the vehicle body.

The drive circuit and the like of the PDU 18 produce more heat than other parts. Therefore, the PDU 18 is closely-attached to the PDU attachment surface 32 of the partition wall 25a through an area as wide as possible so as to transmit heat produced from the drive circuit and the like to the partition wall 25a for heat dissipation.

On the other hand, a plurality of fins 40 project from the partition wall 25a in the air introduction space 24. Heat transmitted from the PDU 18 to the partition wall 25a is further transmitted to the fins 40.

The air introduction space 24 is formed with a front opening portion 13a at a front end portion thereof. A cooling fan 22 is installed in the front opening portion 13a so as to supply air into the air introduction space 24. The cooling fan 22 is disposed between the above-described battery box 19 and PDU 18 as viewed in lateral elevation in FIG. 1 and has a function of sucking air inside the battery box 19 from the discharge port 20b. The discharge port 20b of the battery box 19 and the front opening portion 13a of the swing arm 13 conform to each other in the vehicle body-width and -height directions and their openings are arranged to face each other. Consequently, air discharged from the discharge port 20b is efficiently taken into the front opening portion 13a by the cooling fan 22.

A portion of the partition wall 25a to which the power-generating motor 16 is attached is formed with an air hole through which the air introduction space 24 communicates with the device installation space 23. The air taken in from the front opening portion 13a passes through the air introduction space 24, flowing from the above-mentioned air hole into the power-generating motor 16 to cool the inside thereof, and flows out to the atmosphere.

Incidentally, the power-generating motor 16, the PDU 18 and the cooling fan 22 swing up and down together with the rear wheel WR in conjunction with the swing of the swing arm 13.

Referring to FIG. 5, a pair of attachment portions 46 is formed on the lower side of the swing arm 13 in such a manner as to be spaced from side to side in the vehicle body-width direction. Thus, a main stand 45 is attached to the swing arm 13 by means of an attachment pin 46b (see FIG. 1) passed through attachment holes 46a of the attachment portions 46 so that it swings together with the swing arm 13.

Figure 6:
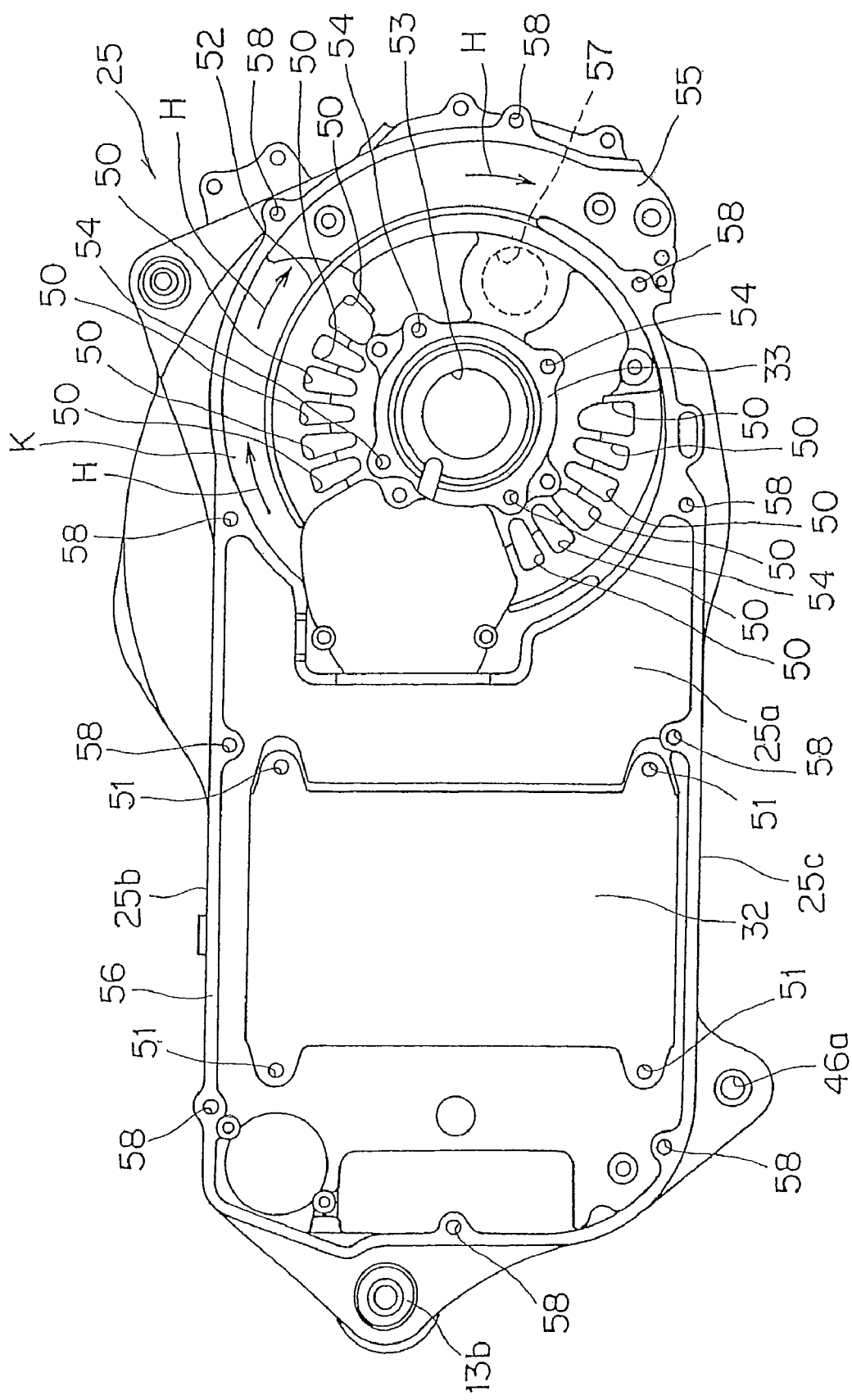
FIG. 6 is a lateral view of a main body portion as viewed from the side of a device installation space.
Figure 7:
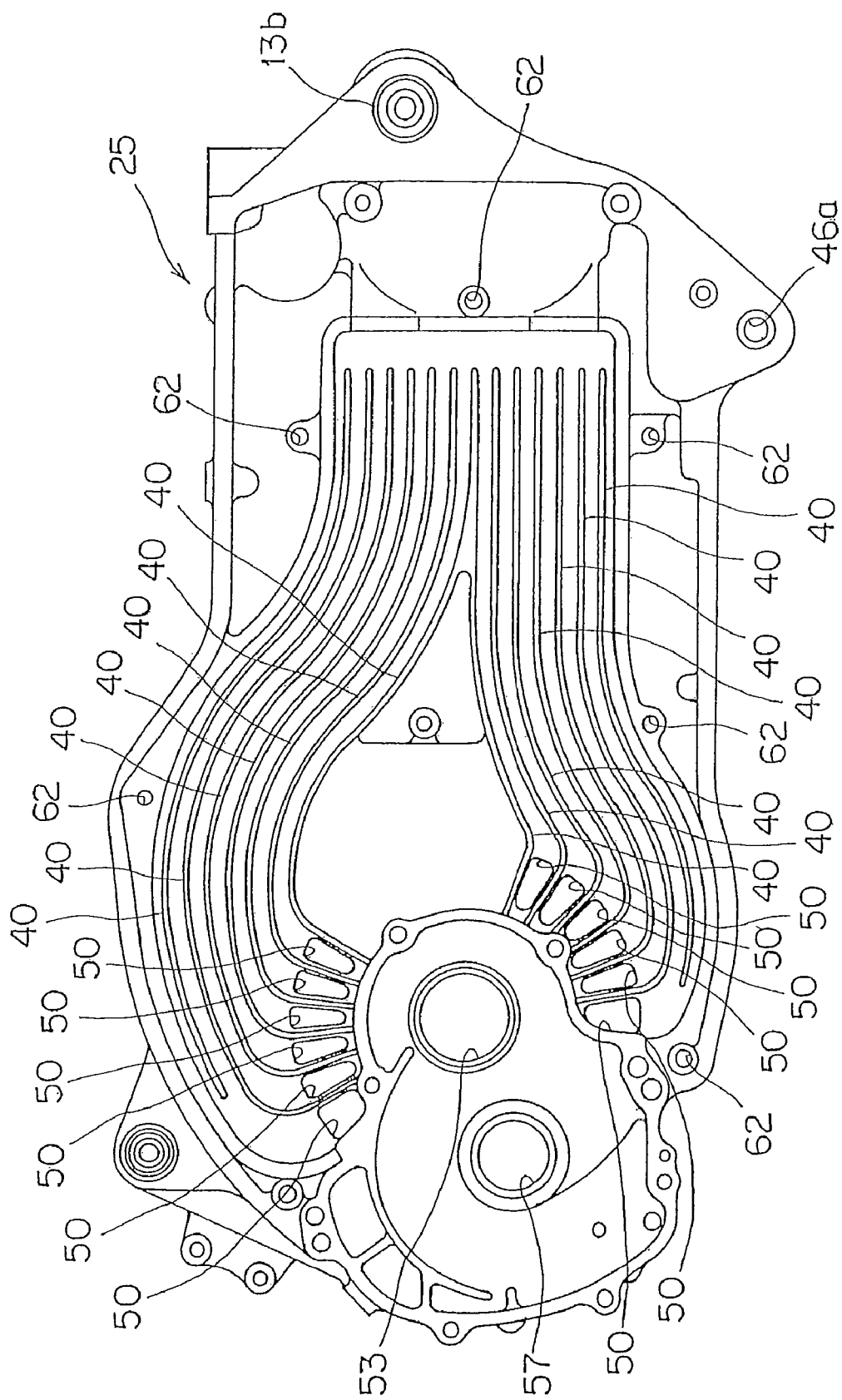
FIG. 7 is a lateral view of the main body portion from the side of an air-flowing space.
Figure 8:
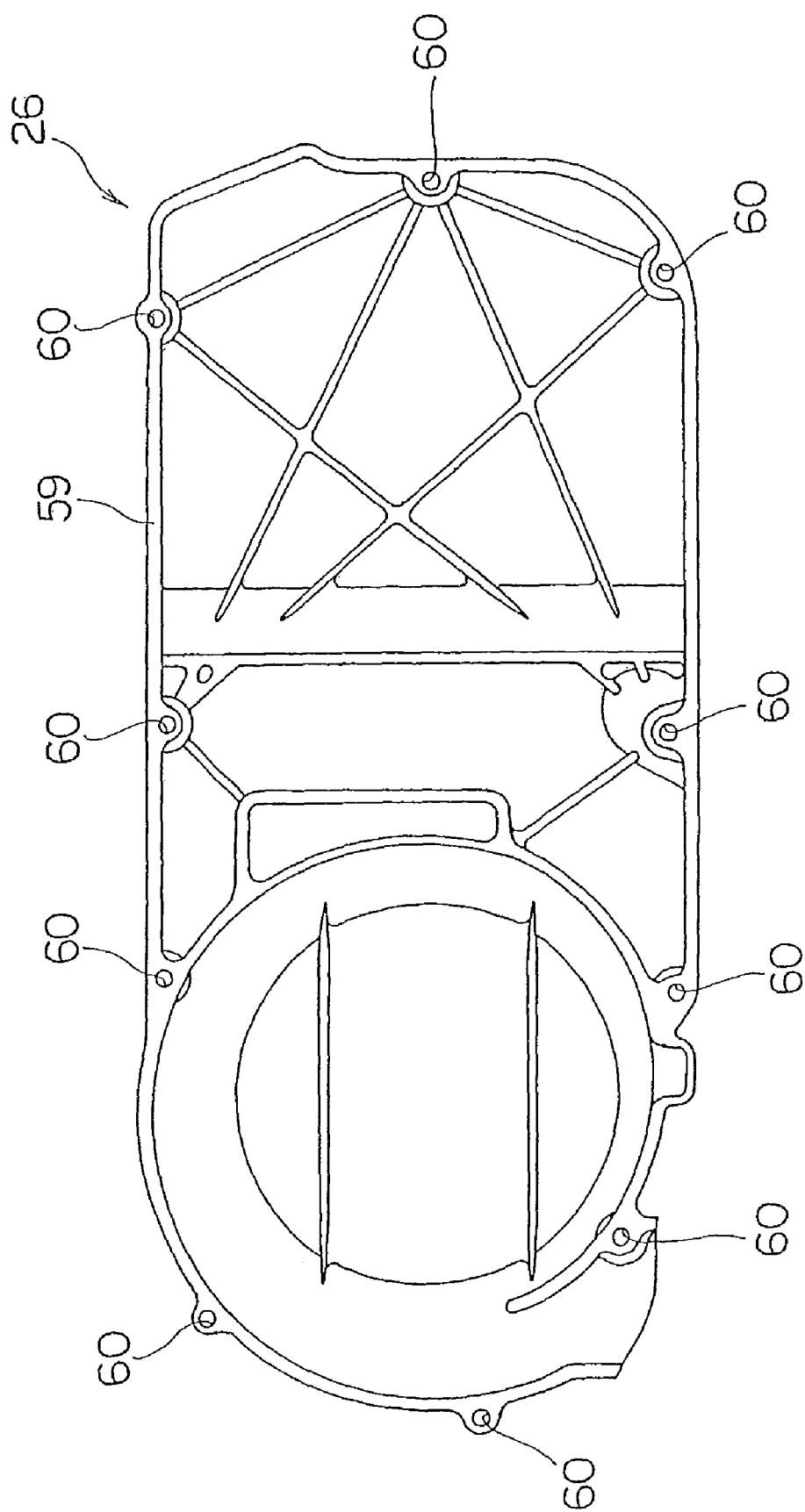
FIG. 8 is a front view of a left cover.
Figure 9:
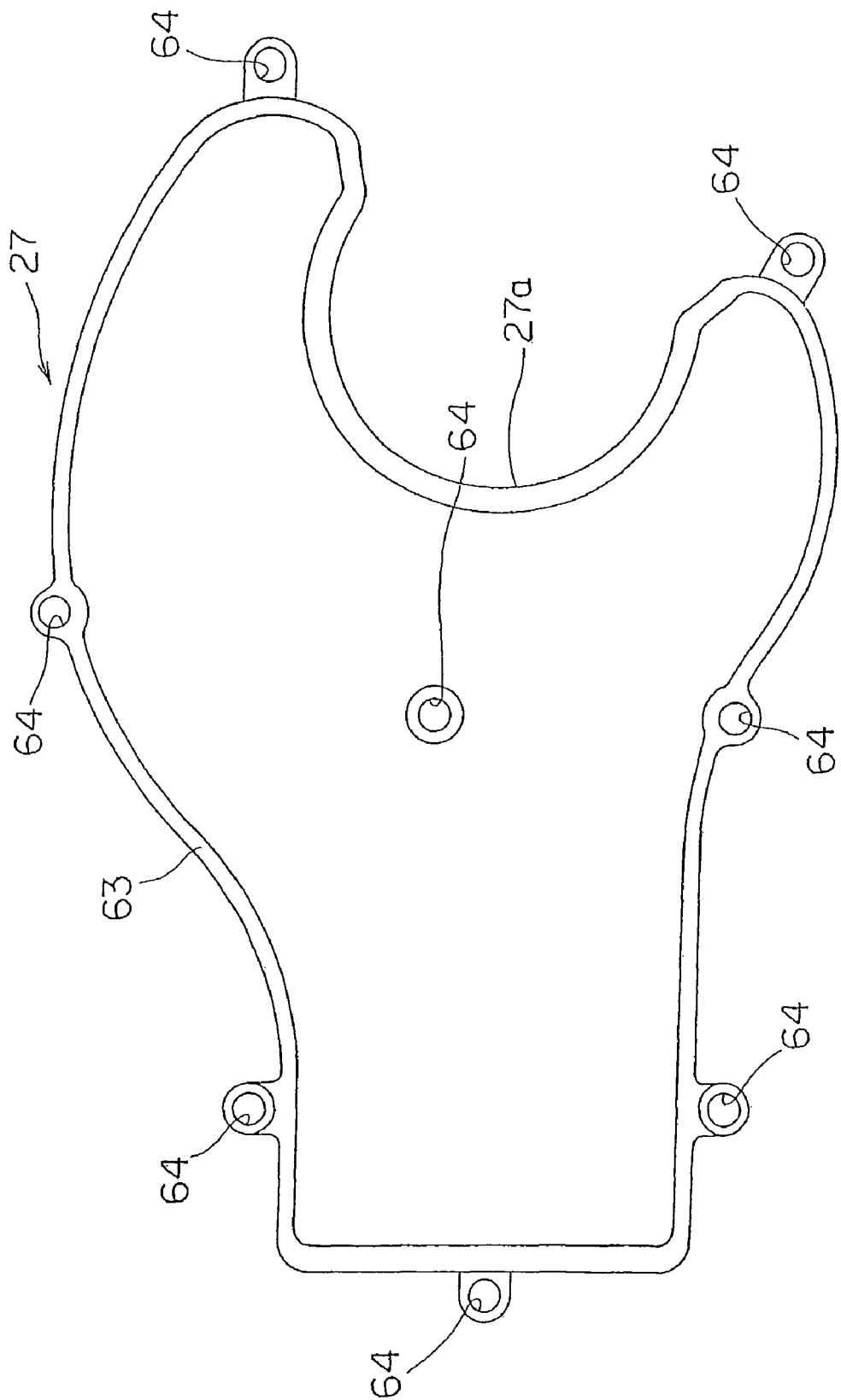
FIG. 9 is a front view of a right cover.

FIG. 6 is a lateral view of the main body portion 25 of the swing arm 13 as viewed from the left (on the side of the device installation space 23). FIG. 7 is a lateral view of the main body portion 25 as viewed from the right (on the side of the air introduction space 24). FIG. 8 is a front view of the left cover 26 as viewed from the main body portion 25 side. FIG. 9 is a front view of the right cover 27 as viewed from the main body portion 25 side.

The main body portion 25 is molded by casting using aluminum material superior in heat conductivity. As illustrated in FIGS. 6 and 7, the main body portion 25 is formed by unifying the above-mentioned partition wall 25a, an upper surface portion 25b and a lower surface portion 25c in such a manner as to vertically hold the partition wall 25a between the upper and lower surface portions 25b, 25c.

The partition wall 25a extends along the shape of the swing arm 13 in the back and forth direction of the vehicle body. As illustrated in FIG. 6, the partition wall 25a is formed with the PDU attachment surface 32 and the power-generating motor-mounting portion 33 on the side of the device installation space 23. The PDU attachment surface 32 is located at a portion where the swing arm 13 obliquely extends from the vehicle body central portion toward the side (see FIGS. 2 and 3). Also the PDU attachment surface 32 is formed so as to be inclined from the vehicle body center to the side as it goes rearward from the front of the vehicle body. The PDU attachment surface 32 and a fixing surface of the PDU 18 are each formed as a generally flat surface. The fixing surface of the PDU 18 is closely-attached to the PDU attachment surface 32 to increase its contact area, which increases thermal conductivity. The PDU attachment surface 32 is provided at four corners with PDU attachment holes 51 used to attach the PDU 18 with screws or the like.

The power-generating motor-mounting portion 33 is formed with a plurality of air holes 50, with an air guide wall 52 and with a through-hole 53. The air holes 50 are adapted to allow the air introduction space 24 to communicate with the device installation space 23. The air guide wall 52 is adapted to guide air entering from the air holes 50, in the circumferential direction of the power-generating motor 16. The through-hole 53 is adapted to receive the drive shaft 16a of the power-generating motor 16 passed therethrough. The power-generating motor-mounting portion 33 is provided with mounting holes 54 around the through-hole 53 adapted to mount the power-generating motor 16 thereto.

The air holes 50 are located externally of the drive force transmitting space 31 (see FIG. 3) covered by the above-mentioned gear cover 34 so as to be circularly disposed around the through-hole 53. These air holes 50 establish communication between the air introduction space 24 and the device installation space 23. In addition, these air holes 50 are adapted to allow air flowing in the air introduction space 24 to flow into toward the power-generating motor 16.

As illustrated in FIG. 6, the air guide wall 52 is generally circularly formed to provide an discharge path K which guides air (indicated with arrow H in FIG. 6) flowing toward the power-generating motor 16 clockwise in the circumferential direction of the power-generating motor-mounting portion 33 from the leftward oblique lower side to the rightward oblique lower side. In this way, air flowing from the air holes 50 cools a stator, not illustrated, of the power-generating motor 16, then passing through the discharge path K, is discharged from an air discharge port 55 located below the main body portion 25.

The shape of such an air guide wall 52 intends to prevent rainwater and dust on the outside of the vehicle body from entering from the air discharge port 55 into the power-generating motor-mounting portion 33 by guiding air in the circumferential direction of the power-generating motor 16.

Incidentally, waterproof fins with labyrinth structure may be provided in the vicinity of the air discharge port 55 to make it difficult for rainwater and dust to enter the power-generating motor-mounting portion 33 from the air discharge port 55.

As illustrated in FIG. 7, the partition wall 25a is integrally formed with a plurality of fins 40 projecting therefrom toward the air introduction space 24 (the side opposite the device installation space 23). The plurality of fins 40 extend from the front opening portion 13a, passing by the rear side of the power-generating motor-mounting portion 33, then arcing along a circle as an outer shape of the power-generating motor 16, and terminates at the plurality of air holes 50. The shapes of the fins fulfill a function of allowing air taken in from the front opening portion 13a to pass through between the adjacent fins 40 and guiding it to the corresponding air holes 50. Since extending from the rear portion of the PDU attachment surface 32 to the rear portion of the power-generating motor-mounting portion 33, the shapes of the fins also fulfill a function of effectively absorbing heat from the partition wall 25a corresponding to these portions for heat dissipation. Further, the provision of the funs 40 fulfills a function of effectively dissipating heat from the partition wall 25a by contact with air at a wider area.

As illustrated in FIG. 7, further, the partition wall 25a is provided with a receiving portion 57 adapted to support a bearing attached to the left end portion of the rear axle 17.

On the other hand, as illustrated in FIG. 6, an edge portion 56 of the upper surface portion 25b and of the lower surface portion 25c, as viewed from the device installation space 23, is provided with a plurality of attachment holes 58 used to attach the left cover 26 thereto. In relation to this, as illustrated in FIG. 8, also a circumferential edge portion 59 of an inner surface of the left cover 26 is formed with attachment holes 60 passing through the external surface of the left cover 26 at respective positions corresponding to the attachment holes 58. The left cover 26 is removably attached to the main body portion 25 by inserting bolts or the like through the attachment holes 60 and threadedly engaging them with the attachment holes 58.

The left cover 26 may be integrally formed of aluminum casting superior in thermal conductivity or of a resin molding.

Similarly, as illustrated in FIG. 7, an edge portion 61 of the upper surface portion 25b and of the lower surface portion 25c and a central portion of the main body portion 25, as viewed from the air introduction space 24, are formed with a plurality of attachment holes 62 used to attach the right cover 27. In connection to this, as illustrated in FIG. 9, also a circumferential edge portion 63 and a central portion of an inner surface of the right cover 27 are formed with attachment holes 64 passing through the right cover 27 to the external surface thereof at positions corresponding to the attachment holes 62. The right cover 27 can be removably attached to the main body portion 25 by passing bolts or the like through the attachment holes 64 and threadedly engaging them with the attachment holes 62.

As illustrated in FIG. 9, a rear end portion 27a of the right cover 27 is formed in such a generally arcuately concaved shape as to avoid the rear axle 17 in an assembly state.

The right cover 27 may be integrally formed of aluminum casting superior in thermal conductivity or of a resin molding.

As illustrated in FIGS. 6 and 7, the attachment holes 46a are formed at the lower surface portion 25c and at a front lower portion of the main body portion 25 so as to attach the above-mentioned main stand 45.

Figure 10:
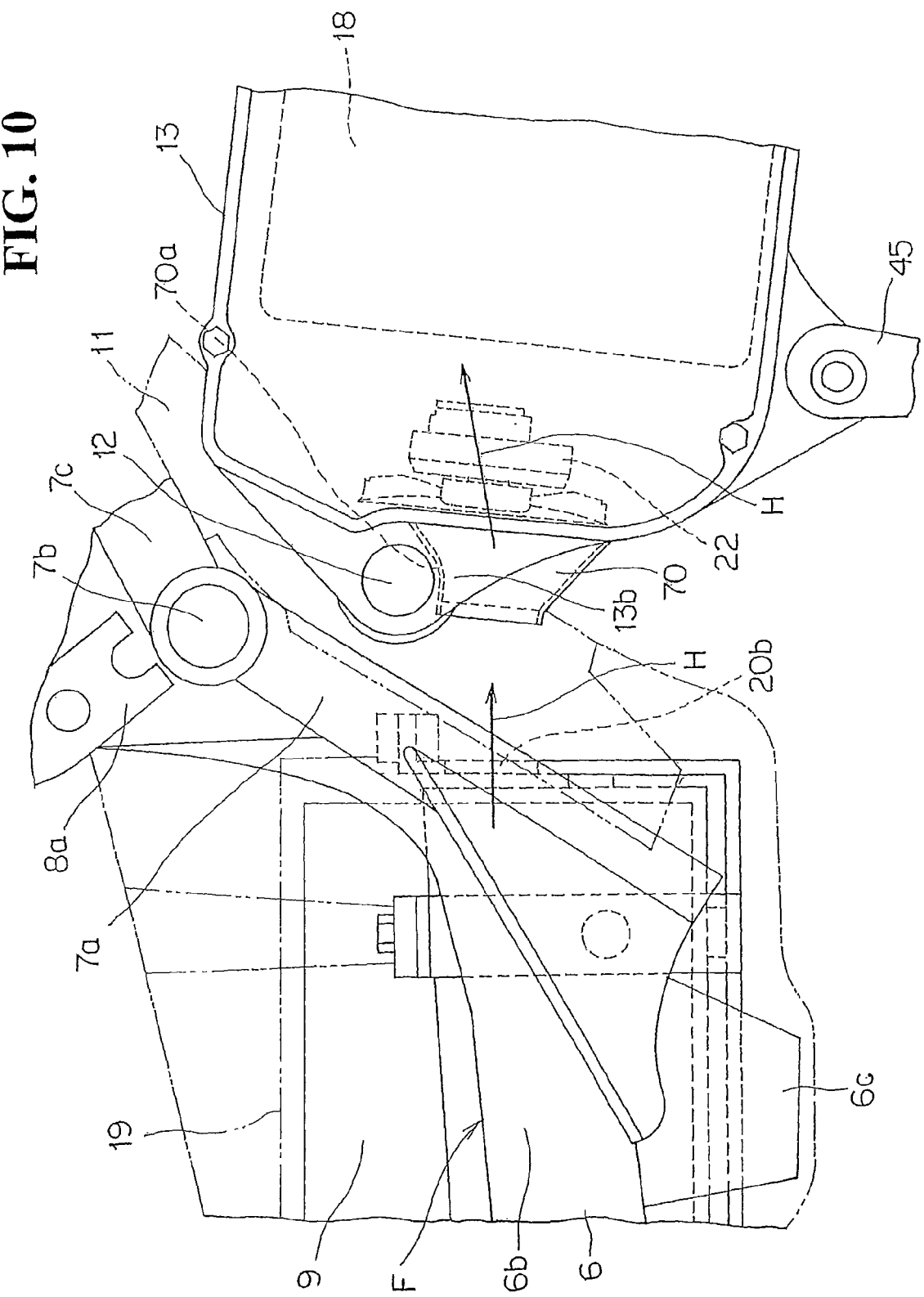
FIG. 10 is an enlarged lateral view illustrating the vicinity of a pivot shaft.

FIG. 10 is an enlarged lateral view illustrating the vicinity of the pivot shaft 12 of FIG. 1. An air guide duct 70 is attached to the swing arm 13 so as to be located below the pivot shaft 12 extending right and left. More specifically, a proximal end of the air guide duct 70 is attached to the front opening portion 13a of the swing arm 13 and a distal end of the air guide duct 70 is disposed close to the air discharge port 20b of the battery box 19. An upper surface portion 70a of the air guide duct 70 is formed generally arcuate around the pivot shaft 12. Thus, even if the swing arm 13 turns, the pivot shaft 12 and the air guide duct 70 will not interfere with each other.

Figure 11:
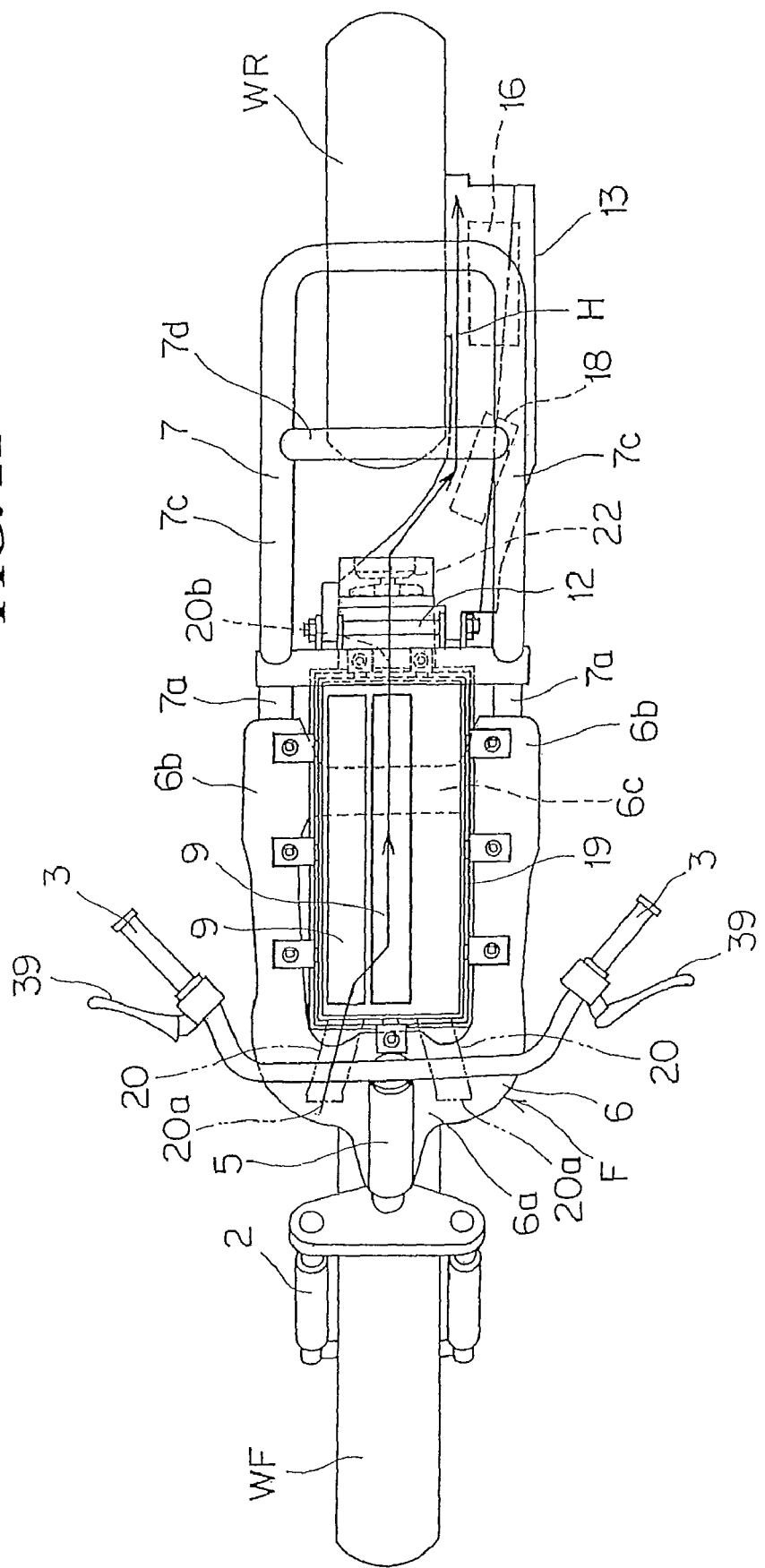
FIG. 11 is a plan view of the electric motorcycle, illustrating the flow of cooling air.

FIG. 11 is a plan view of the electric motorcycle 1, schematically illustrating the flow of taken air. If the cooling fan 22 is operated, air (fresh air) H is sucked from the air introduction port 20a of the battery box 19. The air H that has passed the air introduction duct 20 enters the battery box 19 to air-cool the batteries 9. Further, the air H that has cooled the batteries 9 are sucked out from the air discharge port 20b by the cooling fan 22 and led into the air guide duct 70. Then, the air H flows into the air introduction space 24 from the front opening portion 13a of the swing arm 13 and comes into contact with the plurality of fins 40 in the air introduction space 24. Thereafter, the air H flows through the air holes 50 (see FIG. 6) into the inside of the power-generating motor 16 to cool a stator coil, being guided by the air guide wall 52 (see FIG. 6), and is discharged from the air discharge port 55 (see FIG. 6).

In the plan view of FIG. 11, the flow of the air H is generally linear from the air introduction port 20a located at the front of the vehicle body to the power-generating motor 16 in the swing arm 13. As illustrated in FIG. 2, also the vertical flow of the air H is generally linear because the battery box 19 is disposed below the foot rest space S. In short, the devices of the electric motorcycle 1 are arranged not to resist the flow of the air H.

The electric motorcycle according to the embodiment of the present invention is as below. The battery box 19 housing the batteries 9 is disposed below the foot rest space S. Electricity supplied from the battery 9 is supplied via the PDU 18 to the running-purpose power-generating motor 16. The swing arm 13 swinging around the pivot shaft 12 is attached to the PDU 18. The air introduction port 20a and the air discharge port 20b used to cool the battery 9 are formed in the battery box 19. In addition, the air discharge port 20b and the cooling fan 22 adapted to suck air in the battery box 19 from the air discharge port 20b and supply the air toward the PDU 18 are disposed close to the pivot shaft 12. In this way, the cooling fan 22 is located between the air discharge port 20b and the PDU 18. Thus, the single cooling fan 22 can air-cool both the batteries 9 and the PDU 18.

The swing arm 13 is formed with the air introduction space 24 where the PDU 18 can be air-cooled and air sent from the cooling fan 22 can be sent toward the air introduction space 24. Therefore, the air sent to the air introduction space 24 by the cooling fan 22 can air-cool the PDU 18 more efficiently.

Further, the front opening portion 13a of the air introduction space 24 is disposed close to the pivot shaft 12 and the cooling fan 22 is attached to the front opening portion 13a. Therefore, it is not necessary to provide an attachment space for the cooling fan 22 on the vehicle body side, which can increase design freedom. In addition, since all the air from the cooling fan 22 can be sent to the air introduction space 24, cooling efficiency can be more increased.

The air guide duct 70 is attached to the front opening portion 13a of the air introduction space 24 so as to lead the air discharged from the air discharge port 20b. Therefore, the air sucked from the air discharge port 20b can be sent to the air introduction space 24 via the air guide duct 70. Thus, cooling efficiency can be more increased.

The embodiment of the present invention has been described thus far. However, various modifications and alterations can be done based on the technical concept of the invention.

Figure 12:
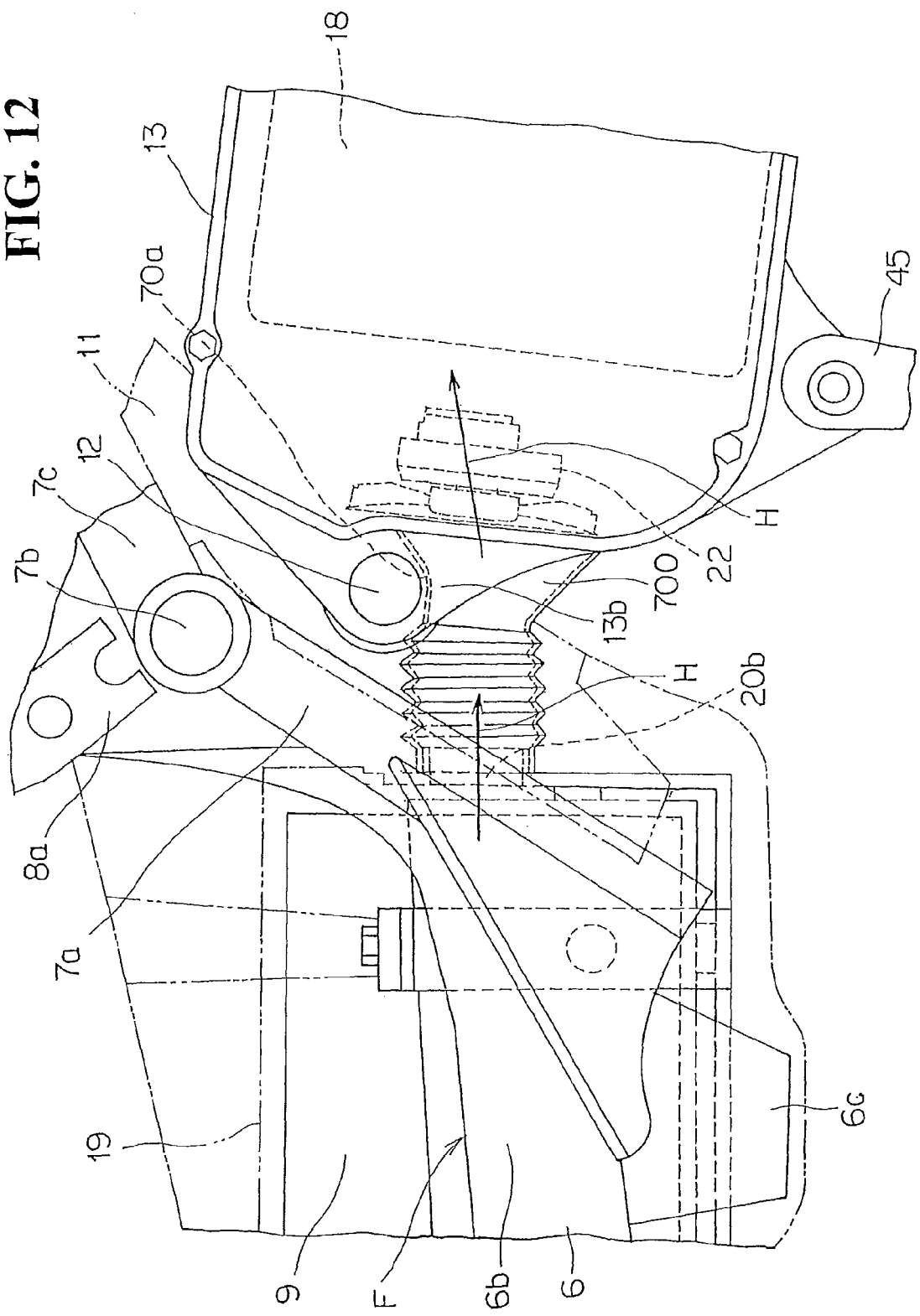
FIG. 12 is a lateral view of a modification of the air guide duct of FIG. 10.

For example, in the embodiment, the leading end of the air guide duct 70 is disposed close to the air discharge port 20b. However, as illustrated in FIG. 12, the air discharge port 20b and the front opening portion 13a may be connected by an air guide duct 700 in such a manner that the leading end of the air guide duct 700 is attached to the edge portion of the air discharge port 20b. In this case, the air guide duct 700 uses a flexible tube or the like, which bends following the turning of the swing arm 13. In this way, all the air discharged from the air discharge port 20b can be led via the air guide duct 700 to the air introduction space 24 of the swing arm 13. Thus, cooling efficiency can be more increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric motorcycle, comprising;
a battery box disposed below a foot rest space;
a battery housed within the battery box,
a power drive unit; and
a running-purpose power-generating motor, electricity supplied from the battery being supplied to the power-generating motor via the power drive unit,
wherein the power drive unit is attached to a swing arm turning around a pivot shaft and the battery box is formed with an air introduction port and an air discharge port used to cool the battery,
a cooling fan is provided which sucks air in the battery box from the air discharge port and sends the air toward the power drive unit, and
the cooling fan is disposed rearward of the air discharge port of the battery box and close to the pivot shaft.

2. The electric motorcycle according to claim 1, wherein the swing arm is formed with an air introduction space where the power drive unit can be air-cooled and air sent from the cooling fan is sent toward the air introduction space.

3. The electric motorcycle according to claim 2, wherein an opening portion of the air introduction space is disposed close to the pivot shaft and the cooling fan is attached to the opening portion.

4. The electric motorcycle according to claim 3, wherein an air guide duct adapted to lead air discharged from the air discharge port is attached to the opening portion of the air introduction space.

5. The electric motorcycle according to claim 1, wherein the swing arm includes an air introduction space and a device installation space, the air introduction space being in communication with the air discharge port of the battery box and the device installation space housing the power drive unit and the power generating motor.

6. The electric motorcycle according to claim 5, wherein the air introduction space includes a plurality of cooling fins formed thereon, the plurality of cooling fins extending into the air introduction space from a device installation space side of the air introduction space.

7. The electric motorcycle according to claim 5, wherein a partition wall separates the air introduction space from the device installation space, the partition wall is formed with the power drive unit attachment surface and a power-generating motor-mounting portion on a device installation space side thereof, the power-generating motor-mounting portion is formed with a plurality of air holes formed therethrough to communicate the air introduction space side of the partition wall with the device installation space side of partition wall.

8. The electric motorcycle according to claim 7, wherein the power-generating motor-mounting portion includes an air guide wall formed on a device installation space side thereof, the air holes being air holes being in communication with a space formed by the air guide wall, and the air guide wall is in communication with the atmosphere.

9. The electric motorcycle according to claim 8, wherein the air guide wall is generally circularly formed to provide a discharge path K which guides air toward the power-generating motor clockwise in a circumferential direction of the power-generating motor-mounting portion from a leftward oblique lower side to a rightward oblique lower side.

10. An electric motorcycle, comprising;
a vehicle body;
a swing arm pivotably mounted to the vehicle body, said swing arm including an air introduction space and a device installation space formed therein;
a battery box mounted to the vehicle body; and
a power drive unit mounted within the device installation space of the swing arm,
wherein the battery box is formed with an air introduction port and an air discharge port, said air introduction space being in communication with the air discharge port, and
a cooling fan is located downstream of the air discharge port to suck air from the air discharge port and send the air into the air introduction space.

11. The electric motorcycle according to claim 10, wherein a power generating motor is mounted within the device installation space of the swing arm, and air from the air discharge port cools the power generating motor.

12. The electric motorcycle according to claim 11, wherein an opening portion of the air introduction space is disposed close to a pivot shaft of the swing arm, and the cooling fan is attached to the opening portion.

13. The electric motorcycle according to claim 12, wherein an air guide duct adapted to lead air discharged from the air discharge port is attached to the opening portion of the air introduction space.

14. The electric motorcycle according to claim 10, wherein the device installation space is in communication with the air introduction space at a location adjacent the power generating motor.

15. The electric motorcycle according to claim 14, wherein the air introduction space includes a plurality of cooling fins formed thereon, the plurality of cooling fins extending into the air introduction space from a device installation space side of the air introduction space.

16. The electric motorcycle according to claim 14, wherein a partition wall separates the air introduction space from the device installation space, the partition wall is formed with the power drive unit attachment surface and a power-generating motor-mounting portion on a device installation space side thereof, the power-generating motor-mounting portion is formed with a plurality of air holes formed therethrough to communicate the air introduction space side of the partition wall with the device installation space side of partition wall.

17. The electric motorcycle according to claim 16, wherein the power-generating motor-mounting portion includes an air guide wall formed on a device installation space side thereof, the air holes being air holes being in communication with a space formed by the air guide wall, and the air guide wall is in communication with the atmosphere.

18. The electric motorcycle according to claim 17, wherein the air guide wall is generally circularly formed to provide a discharge path K which guides air toward the power-generating motor clockwise in a circumferential direction of the power-generating motor-mounting portion from a leftward oblique lower side to a rightward oblique lower side.

* * * * *